(12) United States Patent
Rubin

(10) Patent No.: US 10,707,739 B2
(45) Date of Patent: Jul. 7, 2020

(54) X-Y STAGE WITH ROTATION

(71) Applicant: Kim Rubin, Menlo Park, CA (US)

(72) Inventor: Kim Rubin, Menlo Park, CA (US)

(73) Assignee: Kim Rubin, Menlo Park, CA (US)

( * ) Notice: Subject to any disclaimer, the term of this patent is extended or adjusted under 35 U.S.C. 154(b) by 0 days.

(21) Appl. No.: 16/665,452

(22) Filed: Oct. 28, 2019

(65) Prior Publication Data

US 2020/0067395 A1  Feb. 27, 2020

Related U.S. Application Data

(63) Continuation of application No. 15/479,054, filed on Apr. 4, 2017, now Pat. No. 10,461,620.

(60) Provisional application No. 62/320,152, filed on Apr. 8, 2016.

(51) Int. Cl.
*H02K 41/03* (2006.01)
*H02P 25/066* (2016.01)

(52) U.S. Cl.
CPC ......... *H02K 41/031* (2013.01); *H02P 25/066* (2016.02); *H02K 2201/18* (2013.01)

(58) Field of Classification Search
CPC . H02K 41/031; H02K 2201/18; H02P 25/066
USPC ...................................................... 310/12.05
See application file for complete search history.

(56) References Cited

U.S. PATENT DOCUMENTS

| | | | | |
|---|---|---|---|---|
| 4,654,571 A * | 3/1987 | Hinds | ................. | G03F 7/70716 318/640 |
| 6,075,924 A * | 6/2000 | Will | ............................ | 700/247 |
| 6,097,114 A * | 8/2000 | Hazelton | ............. | G03F 7/70758 310/12.06 |
| 6,441,514 B1 * | 8/2002 | Markle | ............... | G03F 7/70758 310/12.06 |
| 8,717,131 B2 * | 5/2014 | Fullerton | ................ | H01F 7/021 335/306 |
| 8,779,877 B2 * | 7/2014 | Fullerton | ............... | G01D 18/00 335/285 |
| 10,461,620 B2 * | 10/2019 | Rubin | .................. | H02K 41/031 |
| 2006/0267933 A1 * | 11/2006 | Tai | ...................... | G06F 3/03548 345/157 |
| 2011/0089771 A1 * | 4/2011 | Brooker | ................. | G02B 21/26 310/12.05 |
| 2011/0194923 A1 * | 8/2011 | Van Der Burg | ....... | H02K 41/03 414/752.1 |
| 2012/0139365 A1 * | 6/2012 | Pelrine | ................... | H02K 41/03 310/12.05 |
| 2012/0139469 A1 * | 6/2012 | Pelrine | ................... | H02K 41/03 318/696 |
| 2013/0128407 A1 * | 5/2013 | Fullerton | ............... | G01D 18/00 361/143 |
| 2014/0183979 A1 * | 7/2014 | Pelrine | ................... | H02K 41/03 310/12.05 |

(Continued)

*Primary Examiner* — Alex W Mok (74) *Attorney, Agent, or Firm* — Kim Rubin Patent Agent

(57) ABSTRACT

An X-Y movable stage with rotation is described. A fixed base comprises a magnetic bed with a checkerboard, hexagonal or pseudo-random pattern of alternating north and south poles on a grid. A movable puck moves and rotates on the base. The puck comprises three or more nodes where each node may be energized for a north, south, or off magnetic field, with varying field strength. Methods of mapping node locations, controllers, and applications are described. Embodiments for specific applications are described.

3 Claims, 2 Drawing Sheets

MAGNETIC GRID BASE WITH CHECKERBOARD OF N AND S MAGNETIC POLES.
BLACK NODES IN PUCK ON AN X-Y MOVEMENT GRID.

THREE DIFFERENT STABLE PUCK POSITIONS SHOWN.

(56) References Cited

U.S. PATENT DOCUMENTS

2014/0217835 A1* 8/2014 Pelrine .................. H02K 41/03
                                                          310/12.05
2017/0294827 A1* 10/2017 Rubin .................. H02P 25/066

* cited by examiner

Fig. 1

MAGNETIC GRID BASE WITH
CHECKERBOARD OF N AND S
MAGNETIC POLES.
BLACK NODES IN PUCK ON AN
X-Y MOVEMENT GRID.

Fig. 2

THREE DIFFERENT STABLE PUCK
POSITIONS SHOWN.

Fig. 3

TWO DIFFERENT UNSTABLE
PUCK POSITIONS SHOWN.

Fig. 4

FOUR STABILITY NODES IN
MIDDLE. PRIMARY NODES ON
PERIMETER OF PUCK.

Fig. 5

ROTATED PUCK WITH AVAILABLE FORCE ARROWS SHOWN.

Fig. 6

ROTATED PUCK WITH AVAILABLE FORCE ARROWS AND STABILITY NODES.

Fig. 7

PUCK IN STABLE POSITION WITH 3 SUSPENSION MOUNTS.

Fig. 8

PUCK IN ALTERNATIVE STABLE POSITION WITH 4 SUSPENSION MOUNTS.

X-Y STAGE WITH ROTATION

This application claims priority to application Ser. No. 15/479,054, filed 4 Apr. 2017, which further claims priority to application No. 62/320,152, filed 8 Apr. 2016.

BACKGROUND OF THE INVENTION

X-Y stages are used in milling machines, CNC equipment, 3D printers, laser cutters, optics benches, and many other applications.

Prior art X-Y stages use an electric motor (or hand knobs) connected mechanically to the stage for each axis. Play in the connections between the motor rotor and the stage, friction, and changes in dimensions of the stage itself under compression, tension, or twist generate positioning errors between the controller and the work piece or machining head. These errors in turn generate errors in a desired velocity or torque. In addition, typically a motor for one axis moves not only a portion of the stage, but also the motor for the second axis.

SUMMARY OF THE INVENTION

Embodiments below are non-limiting exemplary scenarios.

An X-Y stage of embodiments has no moving parts other than the stage. The embodiment offers no friction and very high resolution, in a typical application. Herein, we refer to a moving portion of the stage or stage system as a puck. The surface on which the puck moves is called herein a base. The puck is able to move simultaneously in X-Y translation and can rotate relative to the base. Thus, the embodiment is a three-axis stage system: "an X-Y stage with rotation."

Embodiments are a base/puck system that comprises a controller moving the puck. Embodiments include not only the base and puck, but also a controller.

Figure 1:
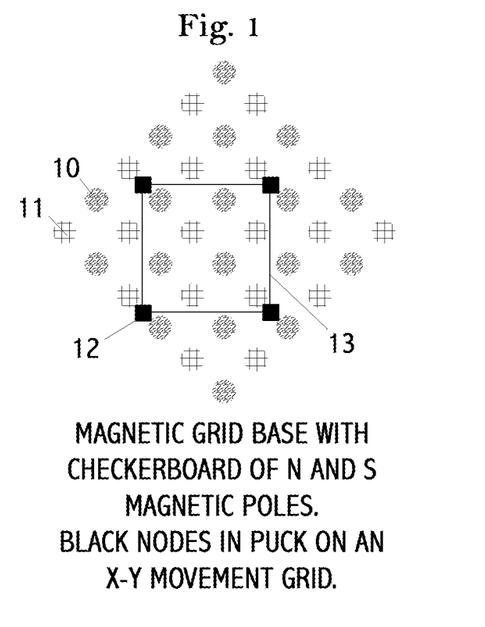
FIG. 1 shows an exemplary base with checkerboard poles and four puck nodes.

A stage system comprises: (i) a flat base comprising north pole and south pole magnets arranged in a checkerboard pattern. It is convenient to picture this pattern rotated 45° to the traditionally-pictured X- and Y-axes, as shown in FIG. 1. The north and south poles are shown as square-hatched and squiggle-hatched circles, respectively.

A stage system further comprises: (ii) a puck that comprises at least four nodes, shown as solid black squares in FIG. 1, aligned on an X-Y grid. In the Figures, the X-Y grid is arbitrarily aligned with the page for convenience of discussion.

It is convenient to think of the puck as having a flat bottom, or surface, that rides on an upper surface of a base. These surfaces are not necessarily planer. In addition, they may not be perfectly parallel. Surfaces may be convex or concave, such as to improve lubrication, stability, performance, application or safety.

In a simple embodiment, four nodes on the puck are electromagnetics, which may be powered off, but for puck motion, are typically configured to have a north or south magnetic field. Field shaping elements are typically used to create field lines at least partially parallel to a surface of the puck.

Embodiments include pucks and bases with no field shaping elements. The orientation of field lines of a magnet varies widely depending on location from the magnet. A controller may take advantage of such widely varying field line orientations to select nodes and field strength to energize.

For convenience of explanation, embodiments may be compared to platforms with Mecanum wheels.

In a device built with Mecanum wheels, each corner of the driven Mecanum platform has a Mecanum wheel at a 45° angle. The puck of embodiments is, in this approximate analogy, similar to the Mecanum driven platform. By powering the motors at each corner either positive or negative, 10 different motions of the stage are possible: 4 translation motions plus or minus in X and Y, four diagonal motions in X-Y, and rotation either clockwise or counterclockwise. All motors may be off, which is a stop or coast mode.

The Mecanum wheel works by providing a plus or minus force that is 45° from the orientation of the platform. The 10 possible motions are obtained by summing the force vectors from the four corners of the platform. Four corner Mecanum wheels with forward or backward drive provide 16 (=2^4) possible combinations. Only 10 of these are generally considered useful.

In pucks of embodiments, this concept of having bipolar force vectors at four different locations applies. However, in In pucks of embodiments, the force on each corner electromagnet, which are in locations on the puck we call nodes, is accomplished by the magnetic attraction or repulsion with fixed magnets or electromagnets in the base. Simply, each corner node is energized with either a north or south field, at a variable strength, or off, which then either attracts or repels some combination of the base magnets, most strongly interacting with the nearest base magnets.

Like the Mecanum-driven platform, there are approximately 2^4=16 possible fully energized combinations for the four nodes in a puck. "Off" is also a valid state for a node. In some cases, neither a north nor a south field at the node electromagnet provides a (useful) force. In these cases, that node's electromagnet may be off. As such, there are more possible combinations: 3^4=81; not including variable strength fields at nodes. A fraction of these, at any given time or position, are generally useful to implement a move.

A Mecanum-driven platform is dependent on friction between the wheels and a surface on which the wheel move in order to operate properly. That is, the force vectors at each corner of the device depend on friction in order to generate force and in particular matched forces at each wheel on its surface. It is typically assumed that the friction at each corner is constant and the same for each wheel.

Unlike a Mechanum platform, pucks of embodiments have no friction, or minimum friction, with the base. More combinations and power levels of node field strength are indeed more useful than partial drive off Mecanum wheels, as will be explained further below.

Suspension of the puck above the base is provided by a second set of electromagnetic suspension mounts. In some embodiments functions of nodes and suspension mounts may be shared or overlap. Optimal desired forces for nodes are parallel to the base while optimal desired forces for the suspension mounts are normal to the base.

DETAILED DESCRIPTION

It is now useful to explain exemplary design and operation by referring to the drawings. Scenarios, drawings and descriptions are non-limiting exemplary embodiments.

Turn now to FIG. 1. A magnetic grid on a base is visible here as hatched and squiggled circles. The base grid is rotated 45° from an arbitrary X-Y grid aligned with the page; we identify this X-Y grid as a "motion grid." We may arbitrarily think of the squiggle-filled circles 10 as a north (N) polarity and the hatch-filled circles 11 as a south (S) polarity. The black square 13 represents a square portion of a puck with four nodes 12. The base magnets, such as 10 and 11, and are also shown similarly in FIGS. 2-8; the base magnets are not redundantly labeled in those Figures.

FIG. 1 shows a base as a checkerboard grid of N and S magnetic poles, such as 10 and 11. The magnetic poles may be created and placed by any process, at any scale. They may be individual manufactured neodymium magnets, a grid of neodymium magnets manufactured as a base group, printed by a magxel machine, or created and assembled into a base by other methods. Scale may very widely, from meters down to nanometers. The magnets are typically permanent, but may also be whole or partially electromagnets. The collection of all N and S poles in the Figure are magnets in a base, or more likely, representative of only a portion of a base.

Four corners of a rectangular portion of a puck 13 are shown as four black squares 12. Each node 12 may be driven to an N or S magnetic field. In this Figure, each node is centered between a N and S pole in the base. Nodes in the puck, such as 10 and 11, may be identified as "movement nodes," for reasons discussed below, In a simple scenario, each of the four corner nodes comprises an electromagnet that may be energized as either an N or S pole, or off. As can be seen easily in FIG. 1, each black node will then have a force vector, not shown, towards one and away from another near base pole. Each of these four force vectors is oriented 45° from the X-Y motion axis—similar to a rectangular puck with four Mecanum wheels. Thus, like a Mecanum driven platform, translation motion in X and Y and rotation of the puck is possible.

In general, it is desirable that the magnetic field lines from both the base magnets and the puck magnets have significant field strength in the plane of the base, rather than normal to the base. Field shaping material, knowledge and simulation software is known in the art, and may be used to shape magnetic fields more towards alignment with this preferred plane, than would be achieved without the field shaping elements. Field shaping elements may comprise Permendur or high-permeability material.

Figure 2:
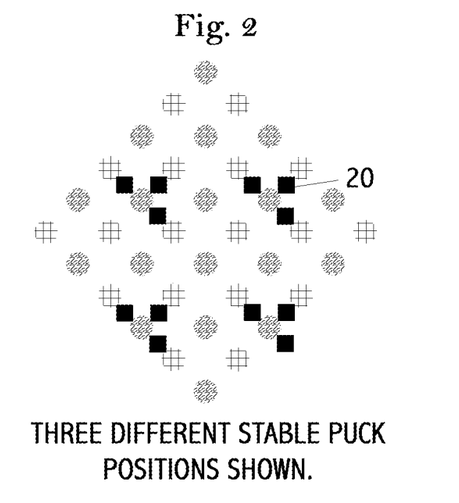
FIG. 2 shows three different stable positions for a simple puck.

Turning now to FIG. 2, we see three additional positions for the puck of FIG. 1. Four corner nodes are again shown as solid black squares, 20. Each position is identifiably by observing a group of three closely spaced corner nodes. A puck outline is not shown. Each of these positions is, "stable." A stable position is one where the puck may be maintained in that position, or controllably moved away from that position, by modulating electromagnetic fields of the puck nodes. In each shown position, like the position in FIG. 1, a full set of four force vectors drives 10 available motions of the puck.

In some cases, the puck moves from one stable position to another. While such "stepping motor" type fixed step positions are simple, it is sometimes desirable to have smooth and continuous motion. As long as the puck is moving in any direction, it is passing through positions that are not unstable. Somewhat like an ice skater, if the puck is moving, then power is available to provide force vectors to change the motion in any direction.

Figure 3:
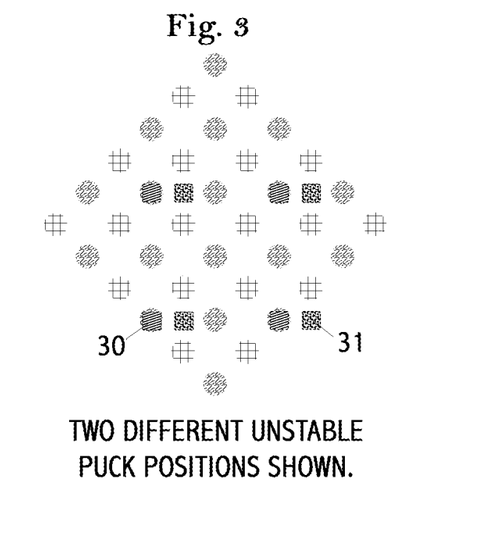
FIG. 3 shows two different unstable positions for a simple puck.

Look now at FIG. 3. Not all stopped puck positions are as conveniently stable as shown in FIG. 2. FIG. 3 shows four corner nodes in two "unstable" positions, 30 and 31, of the same puck shown FIGS. 1 and 2. Here, four nodes in a first unstable position are shown as squares with diagonal hatch, 30. In a second unstable position, four nodes are shown with a random dot pattern, 31. Observe than when all four nodes are directly over a pole, no force vector in the X-Y plane is available. Observe than when all four nodes are centered between a pair of N poles and a pair of S poles, that also no force vector in the X-Y plane is possible. Therefore, we identify these node positions as, "unstable." In some ways, they are like a "top dead center" position in a mechanical system. Any noise or motion will cause a force vector to become available. That is, should these nodes be energized, the puck corners will surely move—we just aren't sure in which direction or precisely when.

Figure 4:
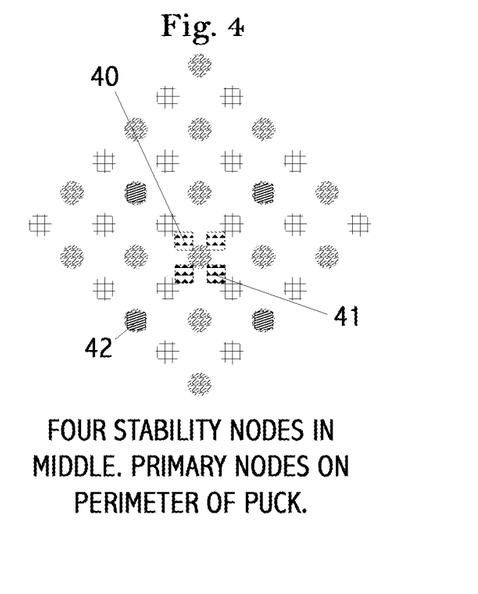
FIG. 4 shows a puck with added stability nodes.

Look now at FIG. 4. A solution to the instability positions shown in FIG. 3 are the addition of some number of "stability nodes" shown as squares 40 and 41 in FIG. 4. In a simplest embodiment, no such stability nodes are needed. Energizing some combination of nodes shown in FIG. 3 will move the puck off "top dead center" and once it is moving (in some direction) then controlled, desired motion can begin. However, rather than a "kick start," the addition of one or additional stability nodes as shown in FIG. 4 is a better solution. If two stability nodes are used, like those shown in filled with small triangles, 40, then four possible left-right and up-down motions in X-Y plane are possible, along with diagonal motions. For a planned translation motion, these two stability nodes 40 will nudge the puck in exactly the direction desired. In a more sophisticated embodiment there are four stability nodes as shown in the Figure. With four such stability nodes, now all 10 possible puck motions are possible, even with primary nodes (such as nodes 30 and 31, FIG. 3) in an unstable position.

One good arrangement of the stability nodes is near the center of the puck so that their X-Y translational forces do not tend to rotate or tilt the puck. Such desirable center-of-puck location is shown by exemplary node locations 40 and 41. Many other locations for stability nodes are possible.

These stability nodes might be just as powerful and may be used just as the four primary movement nodes at the corners of the puck. Indeed, one might consider this arrangement as simply eight equal performance nodes in an arrangement that avoids unstable positions completely. In an ideal embodiment, all nodes are driven with optimal signals to achieve the desired force, torque, support, or motion.

Figure 5:
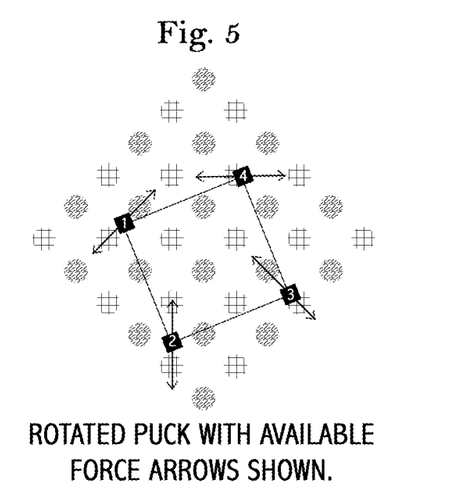
FIG. 5 shows available force vectors for nodes on a simple puck.

Look now at FIG. 5, which shows a puck (square outline) that has been rotated with respect to FIG. 1. Circles and squares have the same meanings as in FIG. 1. Arrows show available forces on the puck nodes, numbered 1 through 4. Maximum available forces on each nodes may not be uniform. However, it should not be assumed that nodes that are close to a pole center (e.g., node 4 in the Figure) have inherently either less or more force available than a node centered between two poles (e.g., node 1 in the Figure). Available force as a function of distance depends on implementation. Note that in this Figure the variety of force directions shown are similar to forces available to nodes in FIG. 1.

Figure 6:
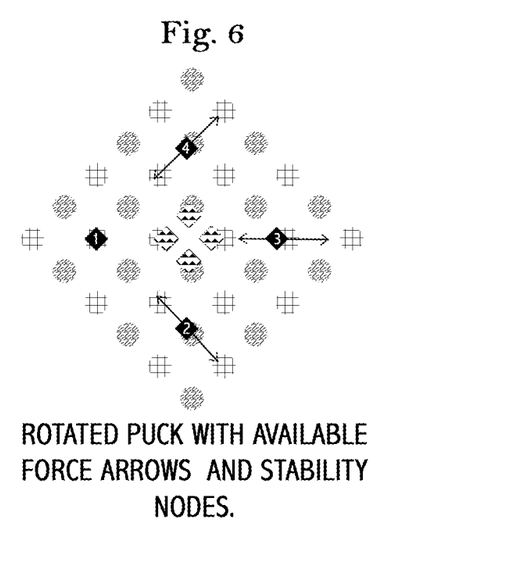
FIG. 6 shows force vectors in a different puck position with added stability nodes.

Look now at FIG. 6. FIG. 6 shows what may be a worst-case rotation of the puck from FIG. 5, shown by the same four corner nodes labeled 1 through 4. Here, node 1 is in an unstable position directly over a pole. Nodes 2, 3 and 4 are not unstable, even though they are close to poles. Arrows in the Figure show available force directions for these three corner nodes 2 through 4. Note that all 10 desirable motions of the puck are not directly available because there are only three nodes with available force. FIG. 6 also shows four stability nodes near the center of the puck, shown as squares filled with triangles, similar to the stability nodes in FIG. 4. Observe that all four of these stability nodes are in stable positions, and so provide a full set of four available force vectors. Thus by using these stability nodes alone, or in combination with the corner nodes 2, 3, and 4, all possible directions of puck movement are immediately possible.

The puck needs to be suspended above the magnetic base somehow. Suspension may be via skid plates, lubrication, fluid such as air, water, oil, etc. through either the base of the puck, ball transfers, casters, rollers, or hung from above on cables or springs. A simple and low-cost embodiment uses a low-friction skid plate surface, such as polytetrafluoroethylene, such as Teflon® (Chemours Company, Wilminton, Del.) or a puck riding on a fluid lubricant or forced air.

Embodiments for machining applications may simply maintain a fluid lubricant between the puck and base. Wheel-like devices can be used such as ball transfers, casters, or rollers.

Embodiments use magnetic repulsion between the base and the puck as a suspension method.

Figure 7:
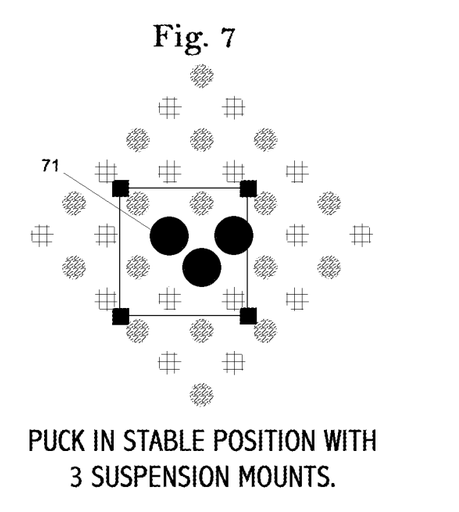
FIG. 7 shows the use of suspension mounts.

Look now at FIG. 7, which shows three "suspension mounts" as solid black large circles 71, covering three N/S base poles. These mounts may be electromagnets in the puck. Other placements are possible. Ideally, the fields for these are shaped so that forces tend to be normal to the X-Y plane, rather than parallel to the X-Y plane, as for the nodes. The suspension mounts are energized for repulsion. If the puck is ideally positioned, such as shown in FIG. 7, then the forces from the three suspension mounts will be vertical, holding the puck above the bed. More than three suspension mounts are possible and are preferred. When the puck moves away from the position shown in FIG. 7 the suspension mounts 71 will no longer be centered over poles. This means that their fields will also generate side forces parallel to the X-Y plane. In an ideal embodiment, these side forces are taken advantage of, or at least compensated for, by a controller.

In one embodiment, the suspension mounts 71 are pulsed. That is, they are energized only when they are acceptably centered over poles. Pulsing may be used in some embodiments. For high-speed motion, the suspension mount pulse rate may be high enough so that it is not a problem. Note that pulse shape may be curved, such as quarter-sine-shaped, rather than square shaped.

FIG. 7 shows a stable position of the puck nodes, shown as before as solid squares. A puck may be stopped in this position. Thus, it useful to have such a stable position also support normal forces for the suspension mounts, as shown with the locations 81 and 82 in FIG. 8. Note that small motions in the X-Y plane due to the suspension mounts is simply countered by (low power) operation of the puck primary nodes. For many types of suspension or lubrication, a still puck may need no power at all, including no power to suspension mounts. Suspension mount locations 71 shown in FIG. 7 are roughly centered in the puck (not shown) to minimize puck tilt.

Figure 8:
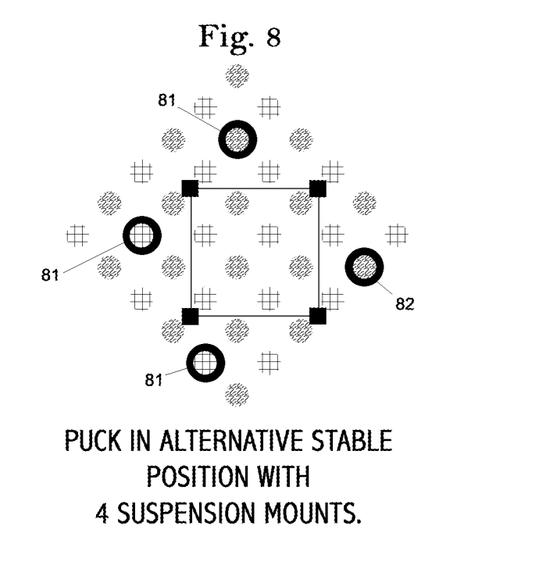
FIG. 8 shows a puck with additional suspension mounts.

FIG. 8 shows the use of four more suspension mounts 81 and 82. Here the puck is in a different stable position (shown again by four solid squares) than shown in FIG. 7. The use of additional suspension mounts, as shown in FIG. 8 by open black circles, permits multiple stable positions of puck nodes while still permitting active suspension via suspension mount repulsion. Here, four suspension mounts are positioned around the exterior of the puck, again positioned to minimize puck tilt.

Many other possible locations, arrangements and quantities for suspension mounts are possible.

Other embodiments vary widely from those described.

All magnetics should be designed to meet the needs of the application. Software is widely available in the art to assist with such design and optimization. Typically, fixed magnets and electromagnets should be separated from other fixed magnets and electromagnets to minimize undesirable field interference. Ideal forces for the nodes are as parallel to the X-Y plane as possible. Ideal forces for the suspension mounts are normal as possible to the X-Y plane. Magnetic field shaping is well known in the art and may be simulated with available electromagnetic field simulation software, such as MaxFem (open source, http://www.usc.es/en/proxectos/maxfem/) or MagNet v7 by infolytica corporation, Montéal, Québec, Canada.

Neither the magnetic grid nor the movement grid need be square, orthogonal or planer. A bowl-shaped amusement park ride is interesting. Grids may be hexagonal, (e.g., honeycomb) rather than square.

Some embodiments have many more nodes than shown in examples. The number of nodes may be 2, 3, 4, 5, 6, 7, 8, 11, 12, 20, 24, dozens, hundreds, or even millions.

A particularly interesting and valuable embodiment is where either the arrangement of poles in the base or the arrangement of nodes in the puck, or both, is random or pseudo-random. A controller should know the precise arrangements. One novel advantage of random placement, particularly if a large number of poles or nodes is used, is that there are no remaining repeating artifacts related to position. For example, errors may be randomized, rather than in an identifiable pattern.

One embodiment uses charging points for wireless charging of devices. Such charging may be contact or non-contact. An advantage of "any translation, any rotation" is that the device to be charged may be placed in any orientation and charging will occur. For this embodiment, the base operates as a charging pad; a device to be charged comprises a puck arrangement. Nodes are not magnetic but rather are electrical terminals. Permanent magnets may be use to pull a device (e.g., as it is set down) into a working position, similar to a "stable" position for a puck. The electrical contact nodes may be convex to assure electrical contact or may be concave to assist in setting mating positions. Node location may be wireless, rather than contacts, such as coils. An advantage of these embodiments over prior art charging pads is the assured close and aligned proximity between base (pad) nodes and puck) device) nodes, which enables more power transmission. Random or pseudo-random placement of either pad node or device nodes, or both, is that a user may place a device in any position and orientation on the pad. Some fraction of all nodes will make contact (or align for wireless charging) and those nodes will be used. A controller may easily identify touching (or close) nodes and enable those nodes for polarity selection and then charging.

Node scanning, resistance measurements, low voltage sensing, load sensing, capacitive or inductive sensing may be used to identify appropriate nodes for any new charging position.

Applications include stages for manufacturing machines, such as milling machines, CNC machines, or 3D printers. Particularly useful applications are when horizontal forces are minimal, such as for laser cutting, water-jet cutting, drill presses, 3D printers, additive machining, painting, plating and printing, and inspection and measurement machines.

Embodiments may be used for amusement park rides, with both passive and active participation by the occupants of the 'ride puck'. Embodiments may be used for games where users control the pucks. The multiple translation axes and a rotation axis are particularly useful for these applications Embodiments may be used as sports equipment.

Embodiments may be used to position cameras or lighting. The multiple translation axes and a rotation axis are particularly useful for these applications.

Embodiments may be used to move appliances, serving dishes, plates, or food containers on a counter, table, or other surface for private or commercial use, such as in a restaurant or for food service or preparation. Embodiments may permit appliances to move themselves on a kitchen counter. Embodiments may permit plates and serving dishes to move automatically at a table or serving area. Embodiments may be used to move furniture and furnishings, including decorations or set components. An advantage of these application is necessary precision is low and only certain positions, such as "stable" positions, are necessary.

Embodiments may be used for mixing. For example, a puck may be a mixing tool in container, such as paint or chocolate manufacturing, for a liquid, fluid or slurry, or many other processes.

Embodiments may be used for cleaning. For example, a puck may be a cleaning tool, passive or active such as vacuum or sterilizer; the base may be part of a container or floor. Applications include manufacturing, health care facilities, as well as commercial and consumer applications.

Embodiments may be used for manufacturing: in particular, to move items for manufacturing steps, or to move tools or fixtures. Applications include warehousing and docks. Such applications minimize the necessity of manual labor. A puck or base may be temporally placed place on or below an item to move. For example, in a warehouse, a worker or robot may place on package on a temporary puck. The puck and item them move to a destination location. There, another worker or robot removes the item from the puck and the puck is available for additional use. Pallets may be used as pucks.

Embodiments may include embedding magnetic or electromagnetic poles into laminate, flooring, and stainless steel counter tops.

Applications include a base constructed of tiles; and the tiles themselves are claimed as embodiments. Each tile contains at least on base node, or ideally multiple base nodes. Base nodes may be fixed magnets, electromagnets, or combinations. Electrical connectivity may be via connectors built into the tiles such that placing tiles also connects them. Tiles may have a controller and the electrical connections between tiles may include both power and digital signals. Thus, an entire floor or large surface (such as counter or table) may be built or configured to function as a base. In one embodiment, such a base is powered and the objects riding on the base, such as plates or cleaning tools, are passive.

Embodiments may be used for electronic circuit board fabrication, including both traces and component placement. Note that in one embodiment the vertical (normal) force from a placement step or machining step may push the puck against the magnetic base. In such an embodiment, it is desirable that the puck not be moving during such a step. Drilling or parts placements are examples of such steps. So is placing food on a plate, platter, or container.

Some embodiments require strength but limited accuracy, such as an amusement park ride. Some embodiments require low cost with only moderate accuracy, such as food preparation or a game. Some embodiments require both accuracy and speed, such as a manufacturing table. Some embodiments require very high precision but movement is rare, such as use as an optics bench. Some embodiments require inexpensive pucks, such as moving food preparation containers.

In some embodiments, the puck or the node and controller portion of the puck may be low profile, such that it can be added to the bottom of an existing item or device. Nodes may be rings or spirals of circuit board traces.

In some embodiments, permanent "holding magnets" may be used to hold a puck at a fixed position with zero puck power required during such holding. For example, such permanent magnets may be placed where squares 30 or 31 are in FIG. 3, with magnetic field direction for attraction. In such an embodiment, the puck controller is aware of the locations and strength of the holding magnets to overcome any other forces. In such embodiments, if puck suspension is dynamic, it may be turned off for such zero-power location holding.

Power for the puck may come from batteries, either rechargeable or primary, or wires. Power may be provided by magnetic field transmission. In one embodiment either pole magnets or suspension mounds are also used for energy transmittal. The puck may have a "parking space" that provides power for recharging batteries. Such a charging station may use electrical contacts or non-contact power transmission, including charging via light to power conversion. Light may be used to provide energy during normal operation.

We have not yet discussed controllers for such a base/puck stage system. We do not which to imply that such controllers are trivial. However, the technologies for such controllers are well known in the art. In one embodiment a controller may solve all magnetic force equations, for all nodes and all magnets, and select drive (current, voltage or field strength) for all electromagnets in the system, such as all nodes on a puck, to implement desired X and Y translation forces and rotational torque. Somewhat simpler than this, is to do such computations using only the closest, or two closest magnets in the base for each node in the puck. An "inverse" solution is to use a first approximation, which may be for example, the most recently used configuration (that is, all drive value to all nodes), then use an algorithm such as Monte Carlo, simulated annealing, machine learning, or other optimization algorithm, typically one that performs well in large, multi-dimensional spaces, to select an adequate or suitable drive for the nodes. Mapping a base-puck position calculation to a multi-dimensional algorithm may use any linear force available as a dimension, or may use only "closest" or "strongest" nodes pairs or groups as dimensions. In one embodiment, only the closest 1, 2, 3, 4, 5, or 6 node are used for a first, "course" computation. Then, consideration of farther nodes is used for a "fine" computations. A sensitivity analysis, Monte Carlos, or tree-based algorithm may be used for the fine computation.

Initially, a force for additional node considered be treated independently. Since they are presumably small forces, they add to the first approximation linearly. Multiple iterations may be used as part of fine control for even better performance. In one embodiment, a comprehensive computation using near nodes, and all force combinations, is done first, followed by a different algorithm using more distant nodes that considers only a small number of node groups, such as individual base-puck node pairs, for subsequent computations. One embodiment computes a set of forces, then sorts the forces to find a first best match with a needed force. This process may be repeated, each time the needed force being smaller. For example, a first force needed might be one unit upward. This is approximately satisfied by a first node pair, but which then leaves a needed force of 0.1 units to the right. An embodiment uses this algorithm for all nodes or positions, rather than a separate algorithm for coarse and fine positioning.

In one embodiment of a controller, for each iteration (that is, a computation of node drive values), the controller tracks "errors," that is, deviations from an idealized set of X-Y forces, rotational force, horizontal leveling forces, and suspension force. For at least one subsequent iteration, corrections for such errors are included in the computation. Note that this particular embodiment may still be considered "open loop," in that the errors are known by the controller from previous iterations, not determined from real-time sensors.

Forces to consider, in some embodiments, include all six degrees of freedom. Many embodiments do not need to consider all six degrees in all computations.

Embodiments may be driven entirely open loop. Like stepping motors, the discreet magnets in the base and puck provide "known" puck positions. However, in many applications a closed loop system with position, velocity or acceleration sensors may provide a higher performance complete stage system solution. Position sensing is well known in the art.

Calibration may not necessary. It is necessary in some applications and embodiments is straight-forward. A puck is driven in a known or random pattern. Position and velocity are measured with precision equipment. This data is used to determined exact effective positions and strength of nodes. Best fit, multi-dimensional fitting algorithms, simulated annealing, or other algorithms may be used to match raw data to individual node data. An alternative calibration system is to drive a puck with known node strength and polarity, then to measure the actual position, velocity, or both. Errors are computed and used to correct initial node position and effective field strength. Either algorithm may be used iteratively to continually improve accuracy with each iteration. When calibration is complete the precision measuring equipment may not longer be needed. It may be kept for precise closed loop control, such as a puck in use under load. Because nodes are usually mechanically fixed, and field strengths do not drift over time, an advantage of embodiments is that recalibration is rarely necessary. In a closed loop system with position sensors, calibration may be continual.

In one embodiment, there are two grids of magnetic poles in the base. A fine motion grid for the nodes to use for X-Y motion, and a coarser or much coarser grid that is used for suspension. The fine motion grid fields may very short range, while the fields for suspension grid are long range. These two grids may interfere with each other minimally, or at least computationally correctable. The motion controller may take into account field changes due to the suspension grid.

Embodiments include position input or position feedback by using the magnetic base poles. Sensors may be dedicated sensors. A preferred embodiment is to use the node electromagnets themselves a sensors. Observing change in risetime, fall-time, inductance, field-strength, or other parameters may be used to determine how close a node is to a pole, and the pole polarity. Other sensors, such as hall-effect sensors may be used. A hall-effect sensor may be combined with the nodes. Hall-effect sensors, including differential sensors, are a particularly effective sensor type for positions.

Other coding for position may be built in to the base or pucks. For example, optical or magnetic m-codes or other linear codes could be used to determine absolute X and Y position. Other absolute location codes other than m-codes may be used. See, for example, http://www.renishaw.com/en/resolute-absolute-encoder-system-with-rtla-linear-scale-10843.

In one embodiment, slight variations in pole strength code the binary bits of m-codes.

In one embodiment such a linear code is repeatedly placed in one direction, such as X, Y, or on a line in the magnetic base. Then a second linear code is placed repeatedly at right angles to the first code. In this way, the puck moves until it finds at least one line, then reads the line to find its position on that axis. Then, it moves perpendicular to read its position on the other axis. For example, one such code may require 14 bits to code the desired resolution (or 16 bits with error correction). This code line might be placed and replicated every 16 pole positions. Similarly the perpendicular code line is also placed and replicated every 16 pole positions.

A novelty of the above embodiments is that position sensing is accomplished with no additional or limited additional hardware in the base/puck system.

The controller may take into account when computing moves the variation in pole strength due to the position encoding. Once it knows its absolute position, it can compute the strength of every pole.

One advantage of embodiment of magnetic poles, either in the base or puck, is that they are easily made invisible, such as by having a thin sheet placed over the physical magnets. This permits a surface to be used for other visual or practical purposes.

One such purpose may be entertainment, ornamental, or functional, such as for an amusement park rides or food service. Another such purpose may be to provide position determination information, such as visible rulings. Another such purpose might be a floor.

The magnetic bed may be scanned, for example by the puck, in order to create a pole map comprising position, strength, or both, of poles. The puck may have one or more sensors, such as a line of differential hall-effect sensors. The puck may move in a line, recording data on the poles it passes over to add data to the pole map. There may be a reference for the map, such as an edge of the magnetic bed, which may be marked by one or more poles, or missing poles. There may be a grid reference, such as an ideal grid. The grid reference may be created by best fit matching read pole data with the ideal reference, or by other means.

Then, the puck may scan a second line, acquiring additional data for the pole map. As a starting point, this second line scan may use either the partially created pole map or the "ideal" reference map. Data collected on the second line scan is added to the pole map, such as by averaging, or using data specific to each scan direction and merging the data. The reference map may be updated.

This process may be repeated, scanning a third line, for example. The third line may also be the first line, or a new line. During each iteration the data from prior iterations, such as the ideal reference map or the pole map, is improved.

In one embodiment such scanning is done simultaneously or in parallel with use of the device or method, such as during machining.

In one embodiment, the controller is responsive to the pole map. For example, by knowing the precise location and strength of each pole that a puck node is about to pass over, the controller may pick a waveform, possibly including timing, strength, and shape of the waveform, to drive the node. In this way, precision, accuracy and repeatability of puck motion is better than the manufacturing accuracy of the magnetic bed.

Similarly, the location and strength of the nodes on the puck may be calibrated by using them now as sensors passing over the magnetic bed using the pole map. In this way, precision, accuracy and repeatability of puck motion is better than the manufacturing accuracy of the puck.

More than one puck may move on the magnetic bed at the same time. In many applications, such those discussed herein, moving multiple pucks is a particular benefit. Devices, such as pucks, may be identifiably by bar codes or RFID. Devices may be effectively identified by weight. Embodiments include measuring weight on a puck or of a puck by including a distance sensor.

The magnetic bed may be planar or not planar. For example, it may be curved, such as a portion of a sphere, which may be useful in a game or amusement part ride. It may be curved due to the inherent variation of a floor or counter top, for example. The puck may include curvature information. A controller may comprise curvature data.

The base of a puck may not be planar, although for a planar base this is a preferred embodiment. Puck nodes may or may not be planar, although for a planar base this is a preferred embodiment. Suspension mounds may or may not be in the same plane as nodes. Magnets in the magnetic base may or may not be in the same plane as the poles, and may or may not be on the same grid. A convex puck surface may be advantageous to assist a lubricant moving under the puck. A concave puck surface may be advantageous to assist in keeping a lubricant under the puck.

Magnetic base poles and node location may not be on a regular grid at all, but may be on any known pattern, including a random or pseudo-random pattern or more axes. A random pattern may or may not include variation in pole strength, size, location or pole magnetic field angle.

For example, manufacturing method for a magnetic base may not provide accurate placement. Magnetic poles may be sprayed or shot into a base, as one example. Some alignment of pole fields may be accomplished by placing the base in an encompassing or partially encompassing magnetic field during manufacture. Pole elements may be round magnets, rather than cylinders, squares, or hexagonal cylinders. It is advantageous to make manufacturing magnetic base material as cheap as possible. It may be manufactured as sheets or webbing. A web material may determine, at least in part, pole placement. Pole elements may be pressed, or the base material may be melted, cured, or covered to secure pole locations. Known methods for manufacturing laminate, flooring, cloth, webbing, or sheets (e.g. plywood, laminate, stainless steel, cardboard, glass, and the like.) may be used in the manufacturing of magnetic bases.

In some embodiments the magnetic property ("setting") of the poles may be created after the base is otherwise manufactured. For example, strong magnets or a Curie temperature may be used. Or, magnets may be printed or magnetic material may be placed. A 3D printer, X-Y motion machine tool, mask or silkscreen may be used for placement or setting.

In some embodiments the magnetic strength of the poles may be relatively weak. For example, for a low friction platform, minimal planar X-Y force may be required for adequate movement.

In some embodiments a puck is in contact with a base, typically riding on a lubricant, include a solid, fluid or gas lubricant. The degrees of freedom of the puck are now restricted to X-Y translation and rotation. Rotation may not be implemented or used in all embodiments. Thus, there are three degrees of freedom in these embodiments. While ideally only three puck node magnets would be required, there are undesirable positions of the puck on the base where at least one puck node is directly over a base magnet, where in that exact location that puck node is not able to provide a magnet force parallel to the puck surface. Thus it is desirable to have at least one additional puck node.

In some embodiments is desirable to have more than four puck nodes. For example eight nodes, if properly placed so as to minimize the number of puck nodes directly over a base magnet, provide a substantially improved range of available X-Y forces.

In some embodiments the puck is magnetically suspended above the base. For these embodiments there are six degrees of freedom, although the technical requirements for the six degrees of freedom may be significantly different, such as different requirements for force, torque, velocity, load, accuracy, or stability. Generally, at least six puck electromagnets (nodes) are required to implement all six degrees of freedom. However, as discussed elsewhere, it is often desirable to have additional puck nodes. The exact number of nodes depends on application. For consistent forces, a higher number of nodes is desirable. Less demanding applications may use fewer nodes.

In some embodiments the locations of nodes on the puck are random, pseudo-random, or a modified pseudo-random. One method to modify a pseudo-random placement is to add separation between any nodes that are too close for implementation. Another method to modify a pseudo random placement is to add or shift nodes into regions that have fewer nodes.

One method of assigning node location is as follows. Select a first node location. Place the first node directly over a first base pole. Select a proposed second node location and then note all possible distances between the proposed location and the nearest base pole for all possible locations and angles of the puck. Adjust the proposed second node location to maximize the minimum distance in this set. Now place the puck on the base to achieve this minimum distance. Now select additional node locations so as to maximum the spacing from each new node location to the nearest base pole. This process may optionally be repeated, and then the best final node location map selected. The goal is to minimize the number of nodes that are close to base poles, for all reachable or desirable locations and angles of the puck on the base.

An algorithm to select locations for suspension electromagnets is similar. Proposed locations are adjusted to maximize the available suspension (or equivalently, repulsion) forces and stability of the worst position of the puck on the base.

In some embodiments the X, Y, and rotation nodes ("motion nodes") are separate from the suspension electromagnets ("suspension nodes"). This has the advantage that the field shape, size, and response speed may be optimized separately for the motion nodes and the suspension nodes.

However, in some embodiments the rotation nodes may also be used for suspension and suspension nodes may also be used for motion. Most magnetic fields will have field strength in both the parallel plane and the normal axis to the base surface. Thus, for any particular electromagnet drive strength, nodes are likely to contribute to all X, Y, rotation and suspension forces. Computation of desired drive signal strength may be computational large. Nonetheless, such calculations are well within the art. Linear approximations may be used to map desired forces to a drive value. Field strength computations may be comprehensive to a desired accuracy. For example, some combinations of a puck node interacting with a particular base magnet may be know to be too small to bother computing accurately or computing at all. Multi-dimensional optimization algorithms may be used to select an optimum or acceptable set of drive values. In one model, the drive values for the driven nodes each make up one dimension in a multi-dimensional space. What are then optimized are the desired forces, X, Y, and rotation, and optionally suspension forces. The tolerance or acceptable window size for each force is likely variable depending on application and the current state of a system. In another model, each force contribution of each (sufficiently strong) puck node to a/each/all? base magnet corresponds to a dimension in a multi-dimensional space. Drive values are then optimized to get closest to the desired vector sums (for X, Y, and rotation and optionally suspension) of the each contributing vectors in each dimension.

Such computations may be done in real-time based on the then-current or instantaneous values of location and velocity for each direction, rotation and suspension of interest. Such computations may be done in advance of actual motion, that is, "pre-motion." A hybrid model may be used where more comprehensive computations are first done in advance, then these values are adjusted based on real-time feedback. An embodiment uses pre-motion computation (e.g., "off-line") for "coarse" positioning and then real-time feedback for fine positioning. This embodiment has significant computational advantages, including the ability to use remote processing for coarse computations and the ability to select course positioning from a library. An advantage of the hybrid computational system is that such real-time "tweaking" likely involves adjusting the drive of only one or a small number of electromagnets. For example, one electromagnet may be selected that has the largest impact on the correction. That is, its ratio of correctional force to drive value is highest among all electromagnets. Only the drive to that one node is then altered for this real-time tweaking. However, this process may be iterated, selecting the next most effective node and including this node in the set of revised drive values. This secondary, real-time computation is simpler and faster than the initial, pre-motion computation. This in turn provides for faster feedback, more accurate or higher system performance, and lower cost.

In some embodiments the maximum available force in one or more X, Y, and rotational axes is fed back into an upstream move generator, such as a G-code parser or move optimizer. In this way, requested move parameters that cannot be executed by the system will not be generated at all. Such maximum available force computations and numbers may be generated prior to actual moves or may be generated in real-time based on measured positions or velocities of the puck.

Electromagnets frequently have large inductance. Therefore, it is often difficult to generate a desired instantaneous current to achieve a desired magnetic field strength. Ideally, such limited ramp-up and ramp-down current rate-of-change is included as part of the controller's logic or methods. As above, such limitations may be computed in pre-move or in real-time, or both.

A drive signal to an electromagnet may be a current value, a voltage value, or a combination. The drive may be analog or pulse modulated. Other methods of driving electromagnets and coils are known in the art.

The fields of different nodes are likely to interfere with each other. Ideally such interference between close nodes is included the controller's logic or methods. Such interference computations may be simplified with tables, linearization, constants, or simply ignored. Distant nodes typically have a very small effect compared to close nodes.

Embodiments are specifically claimed for any combination of the described elements, methods, and applications herein.

Devices may be stacked. That is the puck of one level may comprise a base of another level.

Claimed embodiments include systems with both one or more stages and one or more pucks. Claimed embodiments also include just a base or just a puck. Claimed embodiments also include just a controller. Claimed embodiments include methods of use. Claimed embodiments include systems and applications.

Claimed embodiments include a system with a course position layer of a base and puck, then a fine position layer on top of that puck. That is, a course puck may have a fine base on its top surface. Such a two-level or three-level system is able to achieve a very high dynamic range of position range and accuracy.

Claimed embodiments include larger, more coarsely spaced suspension magnets in the base with magnetic fields that are predominantly normal to the plane of the base, and where these are placed farther away from the surface of the base than the magnets for movement of a puck. Thus, a course "suspension" grid of magnetic fields may be overlaid with a finer "motion" grid of magnetic fields. The puck may also have two sets of electromagnets, one for suspension and one for movement. Or, controllable electromagnetic nodes in the puck or base may be energized by a controller to provide both movement and suspension.

Embodiments are specifically claimed where the spacing of magnets in a base is not uniform. They may be in a random pattern, pseudo-random pattern, are have a gradient of some kind across the base or from the center of the base to a perimeter point on the base. For example, magnets may be closer spaced in the center of the base than the periphery of the base.

Many embodiments discussed herein use fixed magnets in a base and electromagnets in a puck. However, explicitly claimed are embodiments where one or more magnets in a base are electromagnets. In one embodiment some fraction, including all, magnets in the puck are fixed and the some fraction, including all, magnets in the base are electromagnets. Nearly all other aspects of embodiments described herein are generally the same for this "inverted" embodiment, and thus all such combinations are specifically claimed. One such advantage of this "inverted" architecture is that the puck may be lighter, smaller or faster because the permanent magnets are typically more powerful per weight than electromagnets. A second advantage is a puck free of electromagnets will not heat up from the resistance of electromagnets in the puck. A third advantage is that such a passive puck requires no wires going to it (or internal batteries) to drive the puck. A disadvantage of this inverted architecture is that potentially many more electromagnets may need to be driven. Embodiments are claimed where the puck and base change places. Embodiments are claimed where the puck is below, rather than above, the base.

In one embodiment, large fixed magnets provide at least 50% of suspension force. Electromagnets may provide additional suspension force and may be used to provide suspension stability. For example, a base could have a single, large north magnetic field and a puck could have a single, large, repulsing magnetic field to provide suspension force. Electromagnetic nodes used to control puck movement may also be used to maintain stability in suspension. Alternatively, separate electromagnetic nodes may be used to insure or control suspension height, force or stability. Nodes controllable for puck motion provide forces relative to nearby magnets, and thus even large fields in or surrounding a puck or base do not necessarily negatively impact the ability to control a puck motion as described in embodiments.

Embodiments or applications may be used for delivery of items, large or small, macroscopic or microscopic. Embodiments may be used for assembly of parts.

Claimed embodiments include the use of magnetic printers to create any part of magnetic beds or pucks for applications described or claimed.

Notes on Claims

Notes below should generally be used to construe claims. However, such construction is not applicable and should not be used if such construction is so unclear as to make the claim ineligible.

It is necessary to use common sense and terminology consisted with the art of mechanical systems, magnetic fields and drive for electromagnets. Absolutes tend to not exist in these fields of art due to mechanical tolerances and secondary considerations, the nature of three-dimensional magnetic fields, and complexities of motion control system electronics, computations, and loop control. Rules of equivalence will typically be necessary for determination of infringement.

Claim Construction

The term, "checkerboard pattern" has the common meaning of this term. For example, N poles may correspond with black squares and S poles may correspond with red squares, on a checkerboard. Individual magnets or nodes in the base or puck are not limited to traditional shapes, such as cylinders or rectangular polyhedral. The magnets of electromagnets may not be all the same shape. For example, it may be useful for nodes around the outside of a puck or base to be shaped differently to provide more uniformity over a working area. Puck and base surfaces are often flat and parallel, however no such limitation is in this claim. A puck surface may touch a base surface, or via an intermediate lubricant, which may be solid, fluid or a gas. Typically, each node in the puck has a separate drive signal. However, no limitation exists in this claim that the number of distinct drives signals is less than the number of nodes. A checkerboard pattern does not necessary comprise uniform spacing. A warped checkerboard is included within claim scope. Other embodiments may arrange base magnets in a non-checkerboard pattern. "Proximal to the base surface" include in the base surface and flush with the base surface.

Generally, "X-axis" and "Y-axis" have their common meanings of X- and Y-axes as being orthogonal and parallel to at least one of the puck or base surfaces. Other embodiments use X- and Y-axes that are not orthogonal, or even linear. "An arbitrary combination of X-axis and Y-axis directions" means motion at any angle in an X-Y plane.

Moves in X-, Y- and rotation axis may or may not be simultaneous. For some positional applications, "how it got there" for the puck, in a specific position on a base, may be unimportant. For other applications, an exact path of the puck may be important. Claim scope does not limit or require any simultaneity unless so stated.

A puck has an orientation, as does a base. See FIG. 1, for example. Such orientation may be used to define an axis, although there is no fixed relationship between orientation and an axis unless so state. A puck orientation (e.g., an orientation of a set of puck nodes in a rectangle) that may be 45 degrees offset from a base checkerboard axes, such as in FIG. 1. Such an orientation may be fixed—that is, in effect during most puck moves. Or, such an orientation may be only one of many possible rotational relative orientations. A fixed orientation is particularly relevant for a puck/base stage embodiment that moves only in X- and Y-axes.

Relationships exist between puck node locations and puck position, and locations of base magnets. FIG. 1 shows one such exemplary relationship. In this Figures each of the four puck nodes 12 is equidistant from its each nearest N (10) and S (11) base magnets. Other embodiments use more than four puck nodes and yet maintain this relationship limitation as otherwise described. Described limitations may apply to either a non-rotational or rotational puck.

A puck may contain additional electromagnetic nodes, in addition to the four described and shown, for example, in FIG. 1. These additional nodes may be used for X- Y- and optionally rotational moves, or they may be used for suspension of the puck above a base, or for both. New nodes may be located such that when some of the first four nodes (such as in FIG. 1) are in a "worst case" location, such as directly over base magnets, that these new, second, nodes are optimally located equidistant from base N and S magnets. Such a limitation assures that there is never a position of the puck where more than two nodes in the puck are ineffective for X- or Y-translational moves. It may assure that there are no positions of the puck where more than three nodes in the puck are ineffective for moves.

Some embodiments use two more nodes to the total minimum number of nodes discussed above. Thus, the total number of nodes in a puck may be 8 or more. See FIG. 4 for an example of an 8-node puck. Note that in this Figure, worst-case position for four nodes 42 is best-case position for nodes pairs 40 and 41.

A puck may be magnetically suspended above a base, using three or more suspension electromagnetic nodes. Other embodiments include a puck below a base, and other embodiments include swapping the relative positions of a puck and base. Some portion of suspension electromagnets may comprise fixed magnets. Other embodiments use a single magnetic suspension mounts.

In some embodiments, controllable first electromagnetic nodes, typically used primarily for generating puck motion, may also contribute to suspension force; and suspension electromagnetic nodes may also contribute to motion forces.

Field shaping elements may be used and associated with the suspension electromagnetic nodes. As discussed herein, field shaping is typically desirable in order to bend field lines most effectively for the purposes of an embodiment. Field shaping elements may be used with any embodiment. Field shaping may be used for purposes other that embodiments described in this claim. Field shaping elements may also be used to minimize interference between nearly nodes, reduce cost or weight, or increase performance. Field shaping materials, computation and testing are well known in the art.

Field shaping elements may be associated with controllable electromagnetic nodes, typically used primarily to generate motion forces on the puck. As discussed herein, field shaping is typically highly desirable in order to place field lines in the direction and strength to be most effective for the purpose of that node. Field shaping may be used for purposes other that embodiments described in this claim. Field shaping elements may also be used to minimize interference between nearly nodes, reduce cost or weight, or increase performance. Field shaping elements may be used in association with both permanent magnets and electromagnets.

The term, "pseudo-random" requires a broad construction to include all non-regular arrangements. Such an arrangement of nodes has an advantage in providing fluctuations in force and likely errors in ultimate puck movement that are not pattern sensitive, but rather are more random. Other embodiments provide alternatively or in addition pseudo-random arrangement of magnets or nodes in the base.

A controller for embodiments accepts as input one or more move requests, which may be in the form of desired positions, rotations, translational velocity, rotational position or velocity, or accelerations or torques in any combination of axes. The controller may accept a sequence of move requests and may compute, generate, or both, drive signals responsive to more than one move request. In one embodiment the controller performs computational steps, but does not necessary drive the electromagnets directly. (For example, an electromagnet drive module not part of an embodiment may be placed between a controller's output and an electromagnet.) In other embodiments, the controller drives electromagnets directly. Embodiments include both controllers that do and do not accept signals in real time from sensors associated with the puck, base or some object attached to the puck or base. That is controllers may operate in either closed-loop or open-loop embodiments.

Additional Embodiments

101. Use of a hexagonal grid instead of a checkerboard grid, for either the base, puck or both.
102. Use of a random or pseudo-random pattern of permanent magnets or nodes on either the base, puck or both, where nodes are the same size.
103. Use of a random or pseudo-random pattern of permanent magnets or nodes on either the base, puck or both, where nodes are not all the same size.
104. A restaurant or food service apparatus using any claim or embodiment to move items for food service.
105. A warehouse or distribution facility using any claim or embodiment to move items warehoused or distributed.
106. Any embodiment wherein a portion of the base is constructed from tiles.
107. Any embodiment wherein a portion of the puck is constructed from tiles.
108. Any embodiment the locations of permanent magnets and electromagnets are swapped.
109. A system comprising a base, puck and controller.
110. A controller or a device or system using a controller wherein the controller uses a first method for course positioning of the puck on the base and a second, different algorithm for positioning of the puck on the base.
111. A controller or a device or system using a controller wherein the controller executes a first method for coarse positioning, executed prior to puck movement on the base; and the controller executes a second method for fine positioning in real-time of motion of the puck on the base; wherein the second method is responsive to real-time input from sensors associated with the puck, base, or both.
112. Any embodiment further comprising suspension mounts.
113. Any embodiment wherein the suspension mounts are at least partially permanent magnets.
114. Any embodiment wherein the suspension mounts are at least partially electromagnets.
115. An embodiment wherein the number of suspension mounts is less than three.
116. A charging pad with contacts or wireless charging nodes, adapted to receive a chargeable device sitting on the charging pad, wherein the contacts or wireless charging nodes are configured as in any embodiment, wherein the charging pad corresponds with the base and the chargeable device corresponds with the puck, wherein any permanent magnets or electromagnets are optional, and comprising a controller adapted to determine which nodes on the pad are in electrical communication with the chargeable device; or a controller adapted to determine which nodes on the chargeable device are in electrical communication with the pad; or both controllers.

Definitions

Ideal, Ideally, Optimum and Preferred—Use of the words, "ideal," "ideally," "optimum," "optimum," "should" and "preferred," when used in the context of describing this invention, refer specifically a best mode for one or more embodiments for one or more applications of this invention. Such best modes are non-limiting, and may not be the best mode for all embodiments, applications, or implementation technologies, as one trained in the art will appreciate.

"Contact"—A puck may be in "contact" with a base; that is not suspended. However, a lubricant between the puck and the base is still considered to be contact. For example, a puck may ride on an air bearing or airbed with a controlled spacing between the puck and the base. Separate suspension, or than the air, is not required. This is within the intended scope of "contact."

"Location"—Unless otherwise stated, location and position have similar meaning. In some cases, "position" is a preferred in describing a puck on a base, while "location" is preferred in describing a node on a puck or a pole on a base; such usage is not absolute and is non-limiting.

"Suspension"—A puck may be in "suspended" above a base. Note that such suspension may be implement by magnetic repulsion forces from some combination of magnetic fields generated dynamically in a puck and fixed or variable magnetic fields in a base. Other embodiments use other forms of suspension.

All examples are sample embodiments. In particular, the phrase "invention" should be interpreted under all conditions to mean, "an embodiment of this invention." Examples, scenarios, and drawings are non-limiting. The only limitations of this invention are in the claims.

May, Could, Option, Mode, Alternative and Feature—Use of the words, "may," "could," "option," "optional," "mode," "alternative," "typical," "ideal," and "feature," when used in the context of describing this invention, refer specifically to various embodiments of this invention. Described benefits refer only to those embodiments that provide that benefit. All descriptions herein are non-limiting, as one trained in the art appreciates.

Embodiments of this invention explicitly include all combinations and sub-combinations of all features, elements and limitation of all claims. Embodiments of this invention explicitly include all combinations and sub-combinations of all features, elements, examples, embodiments, tables, values, ranges, and drawings in the specification and drawings. Embodiments of this invention explicitly include devices and systems to implement any combination of all methods described in the claims, specification and drawings. Embodiments of the methods of invention explicitly include all combinations of dependent method claim steps, in any functional order. Embodiments of the methods of invention explicitly include, when referencing any device claim, a substation thereof to any and all other device claims, including all combinations of elements in device claims.

I claim:

1. An X-Y stage comprising:
    a base comprising:
        a base surface;
        a plurality of base magnets arranged in a predetermined pattern, proximal to the base surface, comprising a plurality of north magnetic poles and a plurality of south magnetic poles;
    a puck comprising:
        a puck surface;
        at least four controllable first electromagnetic nodes;
        wherein each of the controllable first electromagnetic nodes is adapted to receive an each node drive signal and generate responsively an each magnetic field;
    wherein the puck and base are adapted such that the puck surface moves proximal to and parallel to the base surface responsive to the node drive signals, due to magnetic attraction or repulsion between the base magnets and the controllable first electromagnetic nodes;
    wherein a plurality of pucks wherein each puck is adapted to hold an optical component and a each motion of each of the plurality of pucks is adapted to align the optical components relative to each other.

2. An X-Y stage comprising:
    a base comprising:
        a base surface;
        a plurality of base magnets arranged in a predetermined pattern, proximal to the base surface, comprising a plurality of north magnetic poles and a plurality of south magnetic poles;
    a puck comprising:
        a puck surface;
        at least four controllable first electromagnetic nodes;
        wherein each of the controllable first electromagnetic nodes is adapted to receive an each node drive signal and generate responsively an each magnetic field;
    wherein the puck and base are adapted such that the puck surface moves proximal to and parallel to the base surface responsive to the node drive signals, due to magnetic attraction or repulsion between the base magnets and the controllable first electromagnetic nodes;
    wherein the puck is adapted to hold a component for machining or inspection.

3. An X-Y stage comprising:
    a base comprising:
        a base surface;
        a plurality of base magnets arranged in a predetermined pattern, proximal to the base surface, comprising a plurality of north magnetic poles and a plurality of south magnetic poles;
    a puck comprising:
        a puck surface;
        at least four controllable first electromagnetic nodes;
        wherein each of the controllable first electromagnetic nodes is adapted to receive an each node drive signal and generate responsively an each magnetic field;
    wherein the puck and base are adapted such that the puck surface moves proximal to and parallel to the base surface responsive to the node drive signals, due to magnetic attraction or repulsion between the base magnets and the controllable first electromagnetic nodes;
    wherein the puck is adapted to transport food or utensils.

* * * * *